US010008898B2

United States Patent
Nelson et al.

(10) Patent No.: US 10,008,898 B2
(45) Date of Patent: Jun. 26, 2018

(54) FOIL BEARING SUPPORTED MOTOR WITH HOUSINGLESS STATOR

(71) Applicants: Alexander R. Nelson, New Britain, CT (US); Charles W. Buckley, West Hartford, CT (US); Giridhari L. Agrawal, Simsbury, CT (US)

(72) Inventors: Alexander R. Nelson, New Britain, CT (US); Charles W. Buckley, West Hartford, CT (US); Giridhari L. Agrawal, Simsbury, CT (US)

(73) Assignee: R&D Dynamics Corporation, Bloomfield, CT (US)

( * ) Notice: Subject to any disclaimer, the term of this patent is extended or adjusted under 35 U.S.C. 154(b) by 274 days.

(21) Appl. No.: 14/812,303

(22) Filed: Jul. 29, 2015

(65) Prior Publication Data

US 2016/0365767 A1 Dec. 15, 2016

Related U.S. Application Data

(60) Provisional application No. 62/174,088, filed on Jun. 11, 2015.

(51) Int. Cl.
| | |
|---|---|
| *H02K 5/02* | (2006.01) |
| *H02K 5/12* | (2006.01) |
| *H02K 5/18* | (2006.01) |
| *H02K 5/20* | (2006.01) |
| *H02K 5/167* | (2006.01) |
| *H01M 8/04082* | (2016.01) |

(52) U.S. Cl.
CPC .......... *H02K 5/02* (2013.01); *H01M 8/04201* (2013.01); *H02K 5/12* (2013.01); *H02K 5/1672* (2013.01); *H02K 5/18* (2013.01); *H02K 5/20* (2013.01); *H02K 2205/03* (2013.01)

(58) Field of Classification Search
CPC .......... H02K 1/14; H02K 1/146; H02K 1/148; H02K 3/38; H02K 3/50; H02K 3/505; H02K 5/02; H02K 5/04; H02K 5/08; H02K 5/12; H02K 5/128; H02K 5/1285; H02K 5/16; H02K 5/173; H02K 5/1735; H02K 5/24; H02K 9/22; H02K 15/00; H02K 15/02; H02K 15/024; H02K 15/12; H02K 15/14; F04C 18/00; F04C 29/0085
USPC .......... 310/43, 52–59, 60 R, 60 A, 89, 254.1
See application file for complete search history.

(56) References Cited

U.S. PATENT DOCUMENTS

| | | | | |
|---|---|---|---|---|
| 3,685,926 | A * | 8/1972 | Blum | F04D 13/06 310/43 |
| 4,227,108 | A * | 10/1980 | Washizu | H02K 1/04 310/214 |
| 4,384,226 | A * | 5/1983 | Sato | H02K 5/04 310/216.115 |
| 5,634,723 | A | 6/1997 | Agrawal | |
| 5,845,509 | A | 12/1998 | Shaw et al. | |

(Continued)

*Primary Examiner* — Tran Nguyen
(74) *Attorney, Agent, or Firm* — McCormick, Paulding & Huber LLP

(57) ABSTRACT

An electric motor stator includes an armature surrounding a longitudinal opening for receiving a shaft, with longitudinal fins protruding from an outer surface of said armature; windings are wound within the armature and protruding beyond ends of the armature; and encapsulant seals the windings to the armature, such that the encapsulant serves as an outer housing for the windings.

17 Claims, 6 Drawing Sheets

(56) References Cited

U.S. PATENT DOCUMENTS

| | | | | |
|---|---|---|---|---|
| 6,464,472 B1 * | 10/2002 | Sekiguchi | ............... | F04D 25/06 |
| | | | | 310/90.5 |
| 6,997,686 B2 | 2/2006 | Agrawal et al. | | |
| 7,459,817 B2 * | 12/2008 | VanLuik | .................. | H02K 1/32 |
| | | | | 310/216.004 |
| 7,687,945 B2 * | 3/2010 | Matin | .................... | H02K 5/136 |
| | | | | 310/52 |
| 7,948,105 B2 | 2/2011 | Agrawal et al. | | |
| 8,044,542 B2 * | 10/2011 | Masuda | .............. | F04B 39/0238 |
| | | | | 310/216.001 |
| 2006/0284511 A1 * | 12/2006 | Evon | ........................ | H02K 1/20 |
| | | | | 310/216.004 |
| 2009/0087299 A1 | 4/2009 | Agrawal et al. | | |
| 2013/0106210 A1 * | 5/2013 | Tsutsui | .................. | H02K 5/128 |
| | | | | 310/52 |
| 2014/0231700 A1 * | 8/2014 | Kotani | .................. | C08L 101/12 |
| | | | | 252/74 |

* cited by examiner

FOIL BEARING SUPPORTED MOTOR WITH HOUSINGLESS STATOR

CROSS-REFERENCE TO RELATED APPLICATIONS

This application claims the benefit under 35 USC § 119(e) of U.S. Provisional Application No. 62/174,088, filed Jun. 11, 2015 and is incorporated herein by reference.

BACKGROUND

Technical Field

The invention relates to motor-driven equipment for movement of gases through fuel cells. Particular embodiments of the invention relate to centrifugal compressors.

Discussion of Art

All fuel cells require hydrogen, natural gas, process fluid/gas to the anode side to operate. Movement of gas is typically accomplished with a blower. Existing technologies that use conventional bearings (ball bearings and sleeve bearings) run at low speed and as a result will be larger and less efficient. In fuel cells the largest parasitic load in the system is the fuel and air blowers. Thus, any improvement in blower efficiency has a dramatic effect on the system overall efficiency. Additionally, these bearings often require oil lubrication that can contaminate the fuel cell and result in damage. Furthermore, in the process gas there might be liquid or caustic material that might damage the motor stator.

SUMMARY OF INVENTION

Embodiments of the present invention preferably comprise the following configuration and components and cooling methods.

The present invention is embodied in a single stage, centrifugal compressor or blower, which has a rotating assembly that causes movement of gas through a compressor volute. The blower is mounted either vertically or horizontally with mounting features like flanges that are part of the volute. The blower may be hermetically sealed, and utilizes UL approved materials and fuel cell approved materials. The rotating assembly of the blower comprises an impeller that is fitted onto the shaft on one end. The rotating assembly is supported by two gas foil journal bearings, and by a set of gas foil thrust bearings. The bearings are lubricated with a small amount of process gas that passes behind the impeller and flows through the bearings and out the exit of the volute, if the cooling of the bearings warrants it. The rotating assembly is driven by a motor. The motor laminations are shaped and formed as cooling fins on the outside of the machine, thus the motor can either be air cooled with the stator stack or have water hoses/pipes wrapped around the fin features for water cooled. The windings are potted and contain thermal conductive material and also are on the outside of the machine, so the environment around the machine self-cools the motor. Generally, the motor is powered by a Variable Frequency Drive. The motor stator has protective pieces on the ends of the motor stator and on the inner diameter of the stator which are bound together, either by spun weld or adhesive. The inner diameter protective sleeve, keeps the process gas from coming into contact with the inner diameter of the motor stator.

The blower does not have a motor housing; the cooling fins are part of the armature of the motor stator. Preferably, the armature is built up of laminations. For example, the laminations may include interleaved materials of relatively high or relatively low magnetic permittivity. Additionally, the blower does not have a blower housing; the bearings are installed into a bearing sleeve and a bearing seat that are mounted onto the stator and the volute, rather than being mounted into a separate outer housing.

The present invention runs at high speed, thus the blower is smaller and weighs less than machines with comparable pressure rise and flow. Also, the blower has features that separates the process gas and leakage flow away from the motor stator and allows the motor stator be cooled in another fashion.

Moreover, certain embodiments of the invention incorporate a thrust bearing that is adjustable without disassembling the compressor. This is by contrast to conventional thrust bearings, which are shimmed to a non-adjustable position. According to these embodiments, a motor thrust bearing, which normally is needed to be adjusted with shims, instead is adjusted with a combination back cap and thrust cap screw that can set the preload of the bearing either before test, during assembly, or during testing.

Particular advantages of the present invention include the following: There is no possibility of oil contamination in the process gas since the machine is oil-free. The heat that is generated by the bearings is moved into the process gas which is useful for energy savings. The blower mounts easily on flanges which are part of the machine. The cooling scheme allows the bearings and motor to run cooler which allows the machine to run faster. The cooling scheme reduces the number of parts in the compressor, resulting in a lower manufacturing cost. There is not a motor housing for the stator or housing for the machine, which saves on the part count, protects the motor from process gas, and improves cooling of the stator. Cooling fins are part of the motor stator laminations, which aid in the cooling of the machine. This also reduces part count and removes the thermal resistance that would occur if there were separate pieces. The protective end caps and inner sleeve on the stator, along with the potting material or encapsulant, protects the windings of the stator and the stator in general from contacting the process gas and damaging the stator. The motor has an adjustable thrust bearing cavity that can change the preload of the thrust bearing without the need of shims, and can change the preload of the bearings while the machine is running. It is a more efficient assembly of the machine and reduces part count. It also removes constant assembly and disassembly of machines to "tune" the preload of the thrust bearings.

The varied exemplary embodiments of the invention, as briefly described above, are illustrated by certain of the following figures.

DETAILED DESCRIPTION

Figure 1:
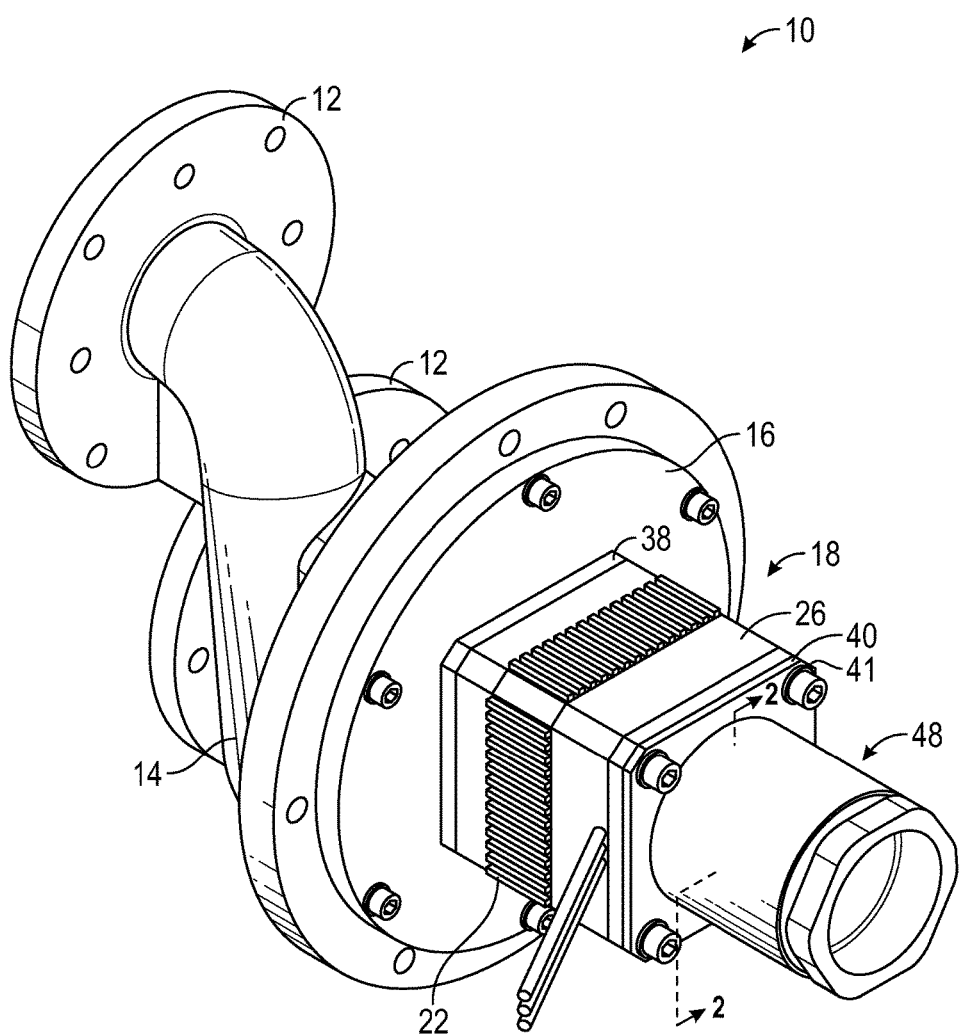
FIG. 1 shows an isometric view of a blower according to an embodiment of the invention.

Embodiments of the invention are shown in the drawings and are described as relating to a typical application of fuel cell fuel or air delivery (either stationary or mobile). Other applications of the invention, however, may include, for example: aeration units, printing systems, and air knives. The machine can be mounted in a vertical or horizontal direction.

Figure 2:
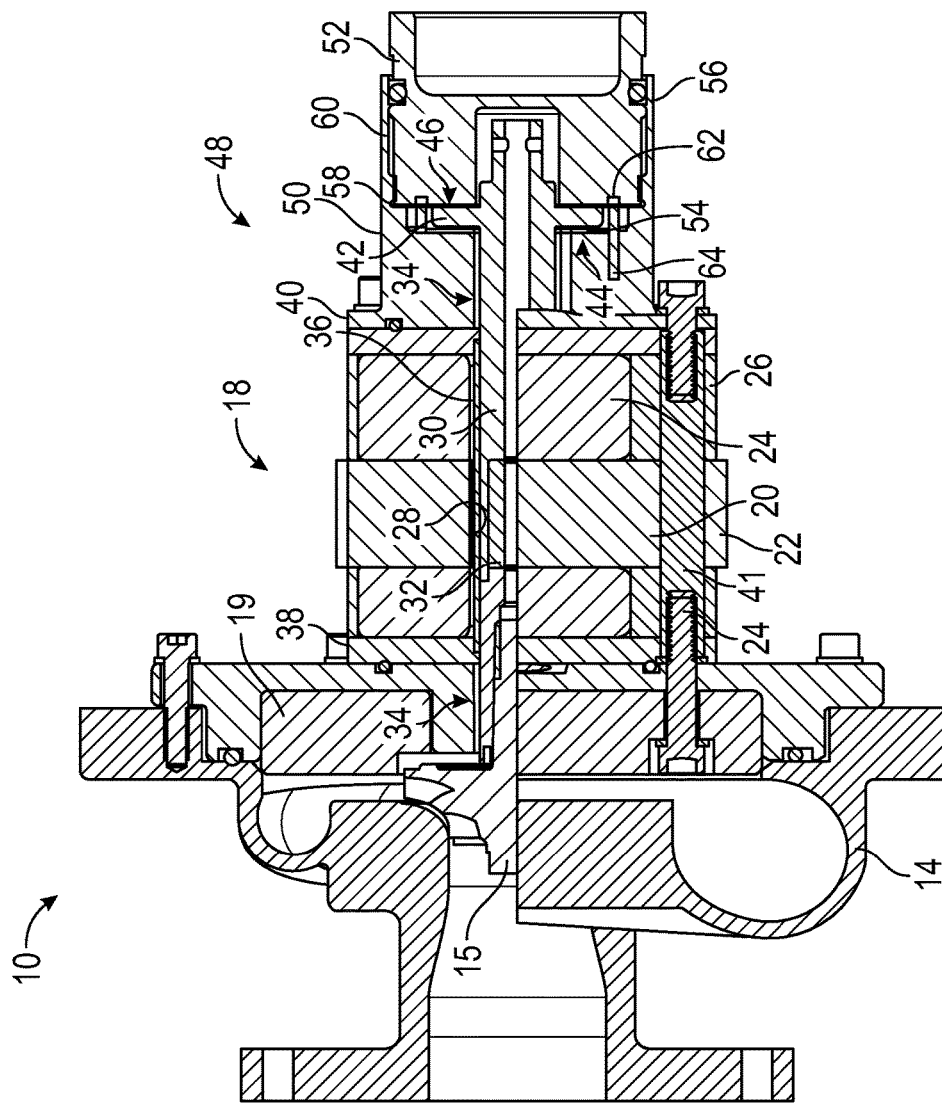
FIG. 2 shows a cross-sectional view of the blower of FIG. 1.

An isometric view of the blower 10 is shown in FIG. 1; FIG. 2 shows internal parts of the blower 10 in a cross-sectional view. In certain embodiments, flanges 12 that connect to a customers system are integrated into a volute 14 of the blower so as to reduce part number and decrease leaks of the process gas. The volute 14 houses an impeller 15, and supports a journal bearing sleeve 16, e.g., by way of cap screws. From the journal bearing sleeve 16 a motor, including a stator 18, is supported by way of hollow rods 41. The volute also may house a vaneless diffuser 19, through which the hollow rods 41 can be bolted; alternatively, the diffuser can be omitted.

Although shown as generally rectilinear or square in section, the stator 18 equally may be round, ovoid, or of other shape convenient to its operation. The stator 18 includes an armature 20, which has fins 22, as well as windings 24 that are wound through the armature. Outside the ends of the armature 20, the windings 24 are encased in an encapsulant material 26. End caps 38, 40 bracket the windings 24 and define a volume of the encapsulant material 26. An adjustable bearing housing 48, which includes a combination journal and thrust bearing seat 50 and an adjustable bearing cap 52, is mounted to the end cap 40 at the end of the stator 18 that is opposite the volute 14.

Figure 7:
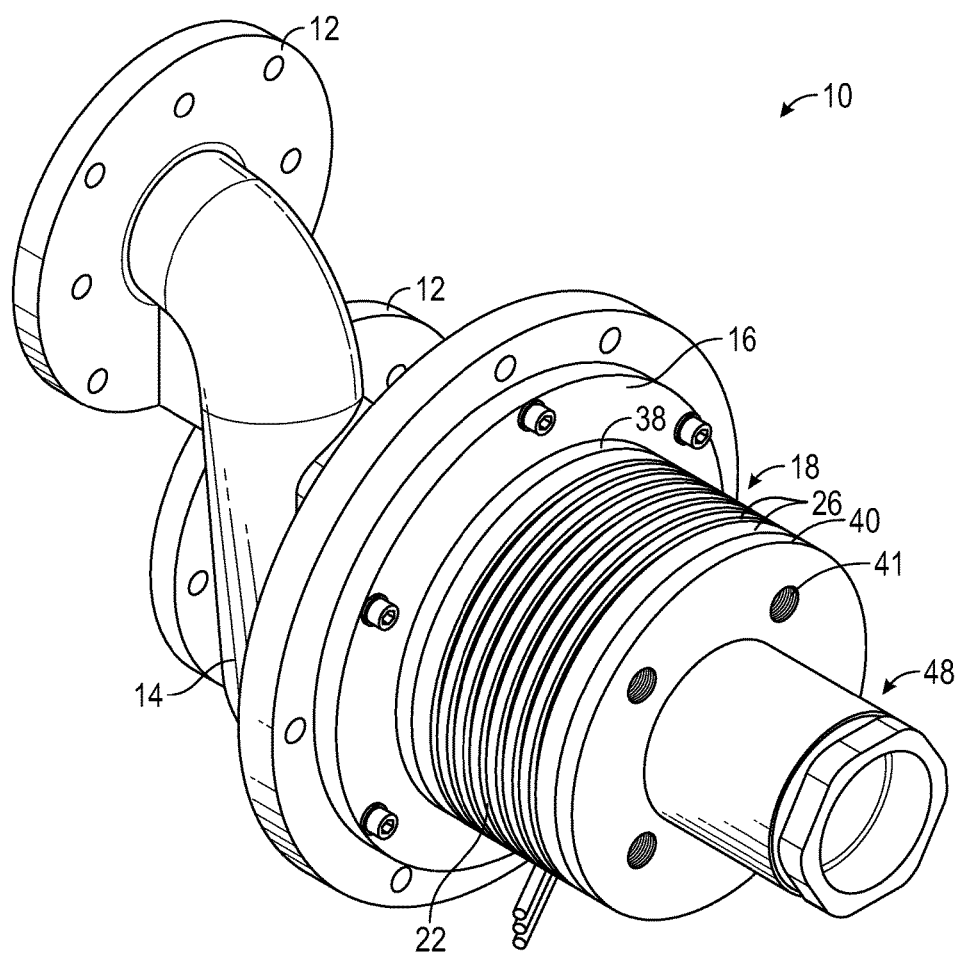
FIG. 7 shows an isometric view of another blower according to another embodiment of the invention.

Laminations of the motor stator 18 are layered along the longitudinal axis of the stator to provide the armature 20, from which cooling fins 22 protrude. Thus, the longitudinal cooling fins 22 protrude from an outer surface of the armature 20 and define longitudinal troughs on the outer surface. Shape and size of the stator fins 22 can be specified according to what the external and internal cooling analysis conditions determine is needed. In certain embodiments the stator fins 22 may be circumferential, as shown in FIG. 7.

The stator windings 24 are wrapped through the armature in conventional manner, and outside the armature (where they protrude from the ends of the armature), they are potted in thermally conductive encapsulant material 26. It is also possible to have an extra protective cap over the potting material, but is not necessary. The encapsulant material 26 seals the windings 24 to the armature 20, and serves as an outer housing of the stator. The encapsulant material 26 may have a thermal conductivity of no less than about 0.24 W/m-K and no more than about 166 W/m-K; in certain embodiments, the encapsulant material 26 has a thermal conductivity of about 4.3 W/m-K. In addition to covering the windings 24, the encapsulant material 26 also may cover substantially the entirety of the fins 22 to seal the entire outer surface of the armature 20.

Optionally, coolant conduits (e.g. hoses or pipes containing a liquid, gaseous, or mixed-phase coolant) can be disposed in contact with the cooling fins 22, or can be run through the armature 20.

Figure 3:
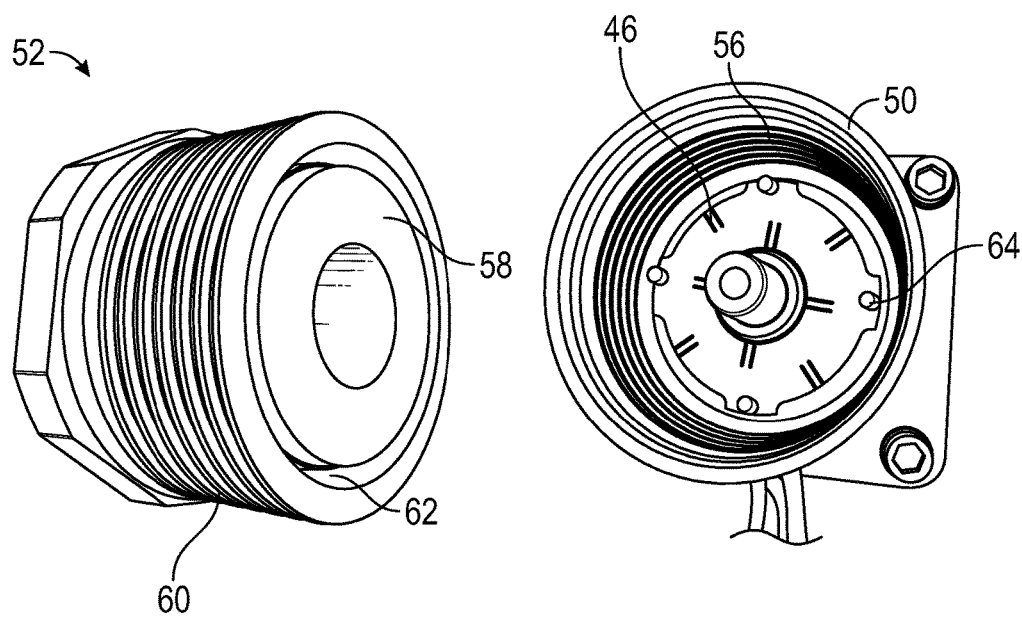
FIG. 3 shows an exploded (disassembled) perspective view of an adjustable bearing housing of the blower of FIG. 1.

Thus, the electric motor stator 18 includes the armature 20 (formed by the laminations) that surrounds a longitudinal opening 28 for receiving a shaft 30. The stator 18, which may be single phase or multi-phase, drives a motor rotor 32 that is integrally mounted into the shaft 30, which turns the impeller 15. The shaft 30 spins within two journal bearings 34, which are situated outside opposite ends of the longitudinal opening 28. For example, as shown in FIG. 3, the journal bearings 34 can be seated within the journal bearing sleeve 16 and the bearing seat 50 that are adjacent to the protective stator end caps 38, 40 as further discussed below.

Typically, the journal bearings are of the gas foil type. Accordingly, process gas will flow along the inner surfaces of the journal bearings 34, both for lubricating the bearings and for cooling the motor rotor 32 and stator 18. However, for electromechanical reasons the armature 20 and windings 24 may be fabricated of or may include material that is chemically reactive with certain process gases. Accordingly, a (non-reactive) protective sleeve 36 lines the longitudinal opening 28 and protects the armature 20 and the windings 24 from process gas.

To prevent direct contact of the process gas with the windings 24, the protective inner diameter sleeve 36 is sealed, e.g. by spin welding or another adhesion method, to protective end caps 38, 40 of the stator 18. The end caps 38, 40 and the protective sleeve 36 may consist of a material or materials that are chemically dissimilar to the armature 20 and the windings 24. For example, the material or the materials of the end caps 38, 40 and of the protective sleeve 36 may be chemically non-reactive with the process gas to be passed along the longitudinal opening 28, whereas the armature 20 may be chemically reactive with the process gas. Thus, the end caps and the protective sleeve hermetically retain all the process gas to the inside of the machine, not allowing any to escape to the ambient environment. The end caps 38, 40 also bracket and contain the windings 24 and the encapsulant material 26. The journal bearing sleeve 16 and the bearing seat 50 are sealingly mounted to their respective end caps 38, 40 such that there is a sealed path for process gas to flow from the volute 14 through the motor 18 and into the adjustable bearing housing 48.

Rigid tubing or hollow rods 41 are provided to clamp the motor stator laminations between the protective endcaps 38, 40, and also can act as coolant (air) conduits as discussed above. The tubing 41 also provides rigidity to the design by radially reinforcing the alignment of the motor stator 18 with the journal bearing sleeve 16 and bearing seat 50. The tubing 41 can be externally threaded to accept fasteners from the bearing seat 50, or can be internally threaded to accept bolts from the backing plate 19 and from the bearing seat 50, thereby clamping together the stator 18, the protective sleeve 36, and the end caps 38, 40. In other embodiments, the tubing 41 can be smooth bore to accept bolts or studs extending from the bearing sleeve 16 through the bearing seat 50 or the other way. The tubing 41 may be sealed with the end caps 38, 40, e.g., by welding or by potting material 26. Thus, the tubing 41 supports all the assembly pieces of the motor stator 18, essentially making the stator one piece. The rigid tubing 41 is not necessary for the design to operate but helps with the durability of the design.

The shaft 30 extends beyond the protective end caps 38, 40 and has at its end proximate the end cap 40 a thrust runner 42, which is supported by thrust bearings 44, 46. The thrust bearings 44, 46 are installed on mating halves of a threaded (adjustable) bearing housing 48, which includes a threaded seat formed on the bearing seat 50 and carrying the first of the thrust bearings 44 as well as a threaded adjustable bearing cap 52 carrying the second of the thrust bearings 46. The threaded features of the bearing seat 50 and of the bearing cap 52, which may be straight threaded or taper (e.g., NPT) threaded, permit of adjusting the thrust bearing preload during operation of the blower 10.

The bearing seat 50 can be made integral with the end cap 40, or can be a separate component mounted onto the end cap 40 as shown in FIG. 3. In addition to an internal bore for receiving one of the journal bearings 34, the bearing seat 50 also includes a land 54 for receiving the first thrust bearing 44, as well as a threaded shoulder 56 that surrounds the land 54.

Figure 4:
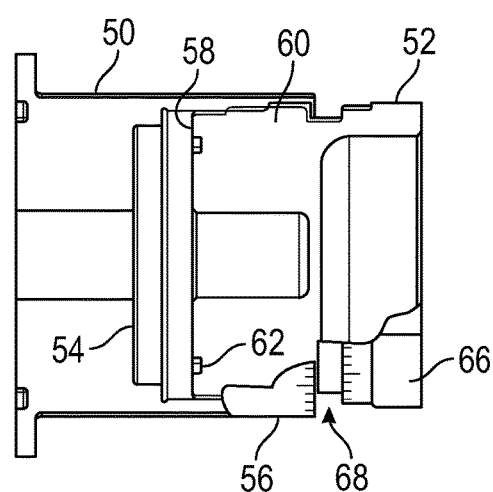
FIG. 4 shows a cross-sectional view of the adjustable bearing housing in a large clearance condition.

Referring also to FIGS. 3 and 4, the bearing cap 52 includes a land 58 for receiving the second thrust bearing 46, as well as a threaded shoulder 60 that surrounds the land 58. On the land 58, an annular groove 62 is indented. The groove 62 is provided for slidingly accepting alignment pins 64 that extend from the bearing seat 50 through the thrust bearings 44, 46, thereby permitting threaded adjustment of the bearing preload by twisting the bearing cap 52, without torqueing either the thrust bearings 44, 46 or the thrust runner 42. Additionally, the adjustable bearing cap 52 can include one or more features that allow for easy adjustment, such as a knurled and/or easy grip feature, or wrench flats 66. The seat 50 and the bearing cap 52 can include, at their peripheral surfaces, complementary visual features for indicating an amount of preload or distance between the thrust cap land 58 to the opposite land of the seat 50, e.g. a Vernier scale 68.

Figure 5:
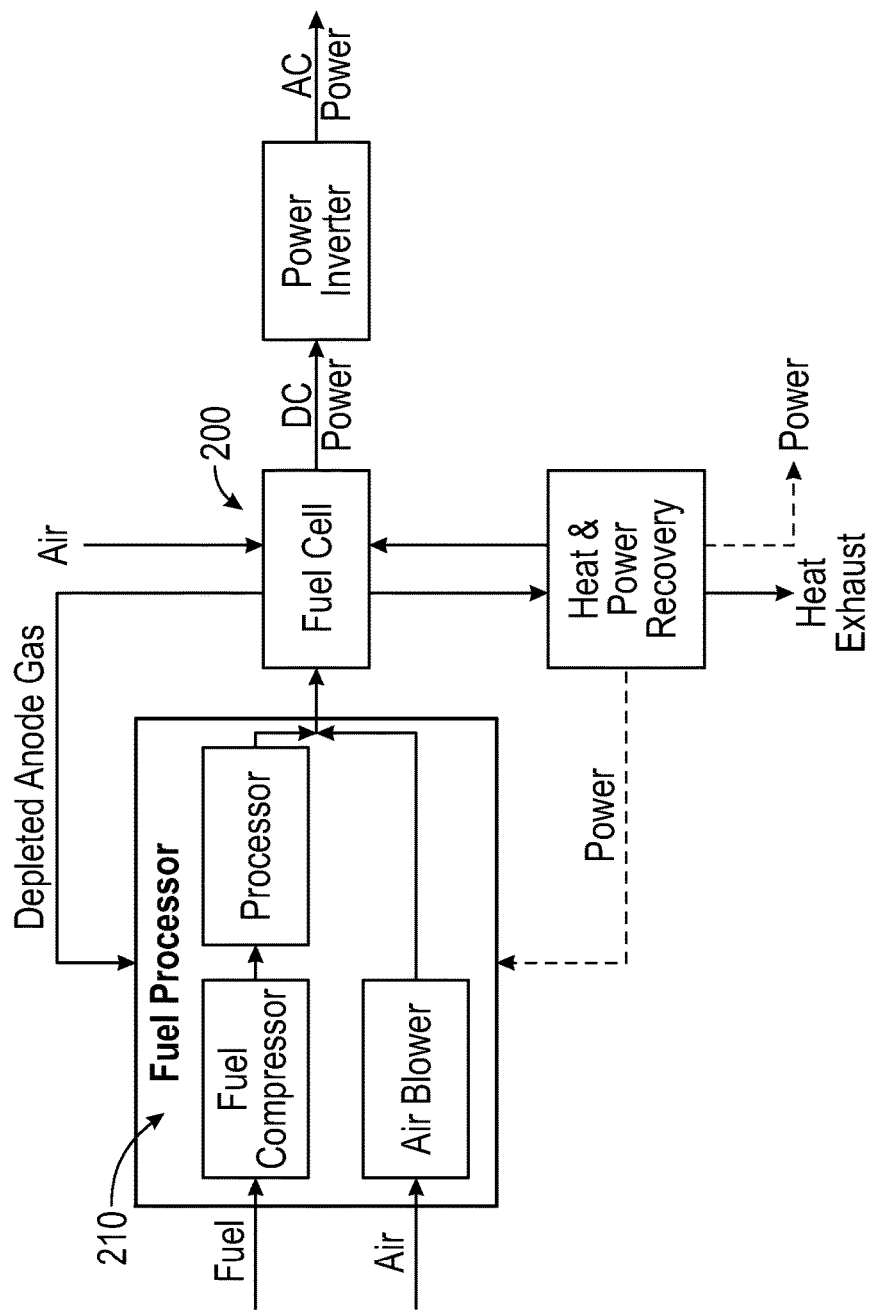
FIG. 5 shows a schematic of a generic Fuel Cell System in which the invention can be used.

As can be seen in FIG. 5, one application for the blower 10 is at the anode side of a fuel cell 200, i.e. as the fuel blower 210 in a fuel cell system. The fuel blower is a critical component in a fuel cell system, in which a process gas could be natural gas, hydrogen, or another proprietary reactive gas. Furthermore, the blower would need a cooling scheme whose internal cooling could not come out of the blower, but also would need the stator to be cooled and protected from the process gas.

Figure 6:
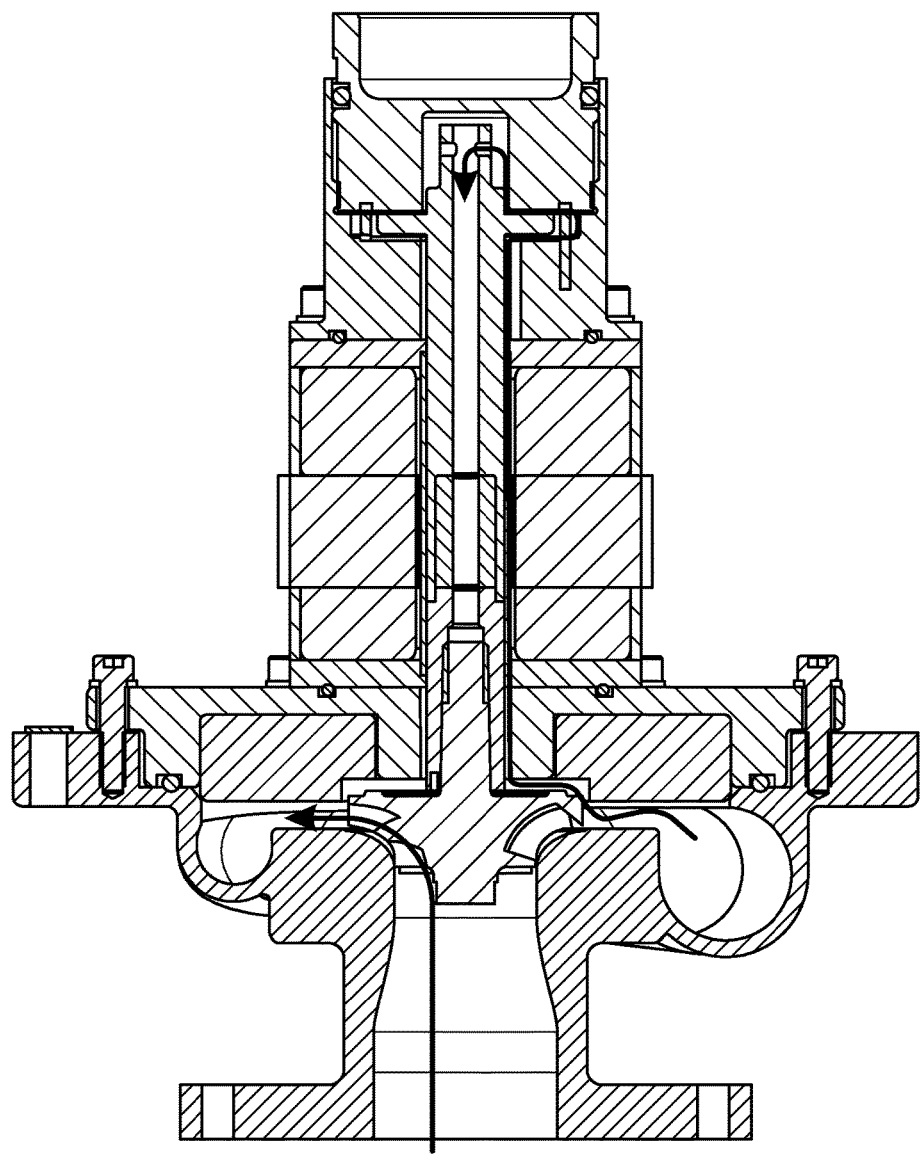
FIG. 6 shows schematically a cooling scheme used in embodiments of the invention.

FIG. 6 shows schematically a cooling scheme of the blower 10. An internal cooling scheme involves leakage of process gas from the centrifugal compressor volute 14 through the first of the journal bearings 34, between the rotating assembly (shaft) 30 and the protective sleeve 36 of the stator 18, through the second of the journal bearings 34, then up and around the thrust runner and thrust bearings 42, 44, 46. The external cooling of the blower is shown through the motor stator fins 22, by conduction through stator and convection (forced and/or natural) to the ambient environment by the means of the fins.

Thus, embodiments of the invention provide an electric motor stator, which includes an armature surrounding a longitudinal opening for receiving a shaft, with longitudinal fins protruding from an outer surface of said armature; windings wound within the armature and protruding beyond ends of the armature; and encapsulant sealing the windings to the armature, such that the encapsulant serves as an outer housing for the windings. The encapsulant may have a thermal conductivity of no less than about 0.24 W/m-K and no more than about 166 W/m-K, preferably about 4.3 W/m-K. The encapsulant also may cover substantially the entirety of the fins to seal the outer surface of the armature. The stator also may include a protective sleeve sealing an inward surface of the longitudinal opening, and extending lengthwise as far as the windings; and first and second annular end caps sealingly connected at respective ends of the protective sleeve, so as to longitudinally bracket the windings, wherein the end caps and the protective sleeve consist of a material or materials that are chemically dissimilar to the armature and the windings, so as to protect the armature and windings from a process gas that flows within the protective sleeve. In other words, the material or the materials of the end caps and of the protective sleeve are chemically non-reactive with a process gas to be passed along the longitudinal opening, whereas at least one of the armature or the windings are chemically reactive with said process gas. The stator also may include rods passed through longitudinal holes of the armature and clamping the end caps against the windings. The rods may be solid or hollow, and may have external threads for attachment of fasteners such as nuts, or for threaded engagement with one of the end caps. The armature may be formed by laying up laminations in planes orthogonal the longitudinal axis of the armature. The laminations may comprise of interleaved materials that are relatively permissive and non-permissive. The stator also may include coolant conduits disposed in contact with the armature, for example in contact with the fins, or extending longitudinally through the armature and the windings from the first end cap to the second end cap. Furthermore, both the stator and the blower are housingless, i.e. the shaft is supported in the bearing sleeve and bearing seat which are mounted onto the stator and volute rather than separately mounted into an outer blower housing.

Although exemplary embodiments of the invention have been described with reference to attached drawings, those skilled in the art nevertheless will apprehend variations in form or detail that are consistent with the scope of the invention as defined by the appended clauses.

What is claimed is:

1. An electric motor stator comprising:
    a noncontinuous outer housing;
    an armature surrounding a longitudinal opening for receiving a shaft, with longitudinal cooling fins protruding from an outer surface of said armature;
    windings wound within the armature and protruding beyond ends of the armature;
    a protective sleeve sealing and lining an inward surface of the longitudinal opening, and extending lengthwise as far as the windings; and
    encapsulant sealing the windings to the armature,
    wherein the encapsulant serves as the outer housing.

2. The stator as claimed in claim 1, wherein the encapsulant has a thermal conductivity of no less than about 0.24 W/m-K and no more than about 166 W/m-K.

3. The stator as claimed in claim 1, wherein the encapsulant has a thermal conductivity of about 4.3 W/m-K.

4. The stator as claimed in claim 1, wherein the encapsulant also covers substantially the entirety of the fins to seal the outer surface of the armature.

5. The stator as claimed in claim 1, further comprising:
    first and second annular end caps sealingly connected at respective ends of the protective sleeve, so as to longitudinally bracket the windings;
    wherein the end caps and the protective sleeve consist of a material or materials that are chemically dissimilar to the armature and the windings.

6. The stator as claimed in claim 5, wherein the material or the materials of the end caps and of the protective sleeve are chemically non-reactive with a process gas to be passed along the longitudinal opening, whereas at least one of the armature or the windings are chemically reactive with said process gas.

7. The stator as claimed in claim 5, further comprising rods passed through longitudinal holes of the armature and clamping the end caps against the windings.

8. The stator as claimed in claim 7, wherein the rods are hollow rods.

9. The stator as claimed in claim 1, wherein the armature is formed by laying up laminations in planes orthogonal the longitudinal axis of the armature.

10. The stator as claimed in claim 9, wherein the laminations comprise of interleaved materials that are relatively permissive and non-permissive.

11. The stator as claimed in claim 9, further comprising:
first and second annular end caps longitudinally bracketing the windings; and
a protective sleeve sealing an inward surface of the longitudinal opening, and sealed with the first and second end caps,
wherein the end caps and the protective sleeve consist of a material or materials that are chemically dissimilar to the armature.

12. The stator as claimed in claim 11, further comprising rods passed through longitudinal holes of the armature and clamping the end caps against the windings.

13. The stator as claimed in claim 12, wherein the rods are hollow.

14. The stator as claimed in claim 1, further comprising coolant conduits disposed in contact with the armature.

15. The stator as claimed in claim 14, wherein at least some of the coolant conduits are disposed in contact with the fins.

16. The stator as claimed in claim 14, further comprising first and second annular end caps longitudinally bracketing the windings, wherein at least some of the coolant conduits extend longitudinally through the armature and the windings from the first end cap to the second end cap.

17. The stator as claimed in claim 7, wherein the rods hold a journal bearing and a vaneless diffuser.

\* \* \* \* \*